United States Patent [19]

Niyada et al.

[11] 4,412,099

[45] Oct. 25, 1983

[54] SOUND SYNTHESIZING APPARATUS

[75] Inventors: Katsuyuki Niyada; Taisuke Watanabe, both of Sagamihara; Shoji Hiraoka, Dobashi; Shuji Morii, Tokyo, all of Japan

[73] Assignee: Matsushita Electric Industrial Co., Ltd., Osaka, Japan

[21] Appl. No.: 264,175

[22] Filed: May 15, 1981

[30] Foreign Application Priority Data

May 16, 1980 [JP] Japan .................................. 55-65545

[51] Int. Cl.³ .................................................. G10L 1/00
[52] U.S. Cl. ...................................... 381/51; 364/513.5
[58] Field of Search ..................................... 179/1 SM; 364/200 MS File, 900 MS File, 513; 84/1.01

[56] References Cited

U.S. PATENT DOCUMENTS 3,295,102 12/1966 Neilson ................................ 364/200
4,266,096 5/1981 Inoue et al. ...................... 179/1 SM
4,278,838 7/1981 Antonov ........................... 179/1 SM Primary Examiner—Emanuel S. Kemeny
Attorney, Agent, or Firm—Pollock, Vande Sande & Priddy

[57] ABSTRACT

In this speech synthesizer which announces the time, storage and complexity is minimized by switching selection of fixed data and variable data from corresponding memories, to compose the phrase "the time is five o'-clock".

6 Claims, 8 Drawing Figures

SOUND SYNTHESIZING APPARATUS

BACKGROUND OF THE INVENTION

This invention relates generally to sound synthesizing apparatus, and more particularly, the present invention relates to apparatus for emitting vocal sounds after selection of words to be pronounced, and edition of (a) sentence(s).

There are various conventional sound synthesizing apparatus, and in most of the conventional apparatus, magnetic disks, magnetic drums, magnetic tapes or the like have been used as a recording medium. Recently, however, techniques relating to LSI (large scale integrated) circuits have been remarkably improved, so that semiconductor memories can be used as a recording or storing medium of such a sound synthesizing apparatus. Generally speaking, in a sound synthesizing apparatus, a sound synthesizing circuit having such a recording medium is controlled by a control circuit so as to emit a desired sound signal. According to the conventional technique, however, the control circuit has been constructed of a microcomputer hitherto. Although a microcomputer has an ability of controlling the sound synthesizing circuit in various ways in accordance with its program prestored in a memory, such as ROM (read-only memory), such a microcomputer consumes relatively large power. Furthermore, since conventional microcomputers are of general purpose, it is troublesome to use a microcomputer when it is intended to add particular functions. In other words, additional peripheral devices or circuits are required for the microcomputer to operate in desired particular manners. Microcomputers have complex structure, and therefore, conventional sound synthesizing apparatus having a microcomputer as their control circuits have required relatively high cost.

SUMMARY OF THE INVENTION

The present invention has been developed in order to remove the above-mentioned disadvantages and drawbacks inherent to the conventional sound synthesizing apparatus.

It is, therefore, an object of the present invention to provide a new and useful sound synthesizing apparatus having a control circuit which is inexpensive and simple in construction.

Another object of the present invention is to provide a sound synthesizing apparatus having a control circuit which consumes less power.

In accordance with the present invention there is provided a sound synthesizing apparatus comprising a sound synthesizing circuit, which converts sound data into sound signals, and a control circuit, said control circuit comprising: (a) a first memory in which information indicative of the order of words to be pronounced and intervals between said words are prestored, said first memory being arranged to be triggered by an external trigger signal; (b) a second memory in which pieces of information indicative of first addresses of sound data are prestored, one of said pieces of information being selected in accordance with said information from said first memory; and (c) a third memory in which said sound data is prestored as parameters, said sound data being read out in accordance with said information from said second memory one after another in synchronism with an external synchronous signal, the read out parameter train being fed to said sound synthesizing circuit to be converted into sound signals.

In accordance with the present invention there is also provided a sound synthesizing apparatus comprising a sound synthesizing circuit, which converts sound data into sound signals, and a control circuit, said control circuit comprising: (a) a first memory in which information indicative of the order of words to be pronounced and intervals between said words as well as switching information is prestored, said first memory being arranged to be triggered by an external trigger signal; (b) a switching circuit controlled by said switching information for selecting said information indicative of the order of words from said first memory or external information; (c) a second memory in which pieces of information indicative of first addresses of sound data are prestored, one of said pieces of information being selected in accordance with said information from said switching circuit; and (d) a third memory in which said sound data is prestored as parameters, said sound data being read out in accordance with said information from said second memory one after another in synchronism with an external synchronous signal, the read out parameter train being fed to said sound synthesizing circuit to be converted into sound signals.

BRIEF DESCRIPTION OF THE DRAWINGS

These and other objects and features of the present invention will become more readily apparent from the following detailed description of the preferred embodiment taken in conjunction with the accompanying drawings in which.

The same or corresponding elements and circuits are designated at like reference numerals throughout the drawings.

DETAILED DESCRIPTION OF THE PREFERRED EMBODIMENT

Figure 1:
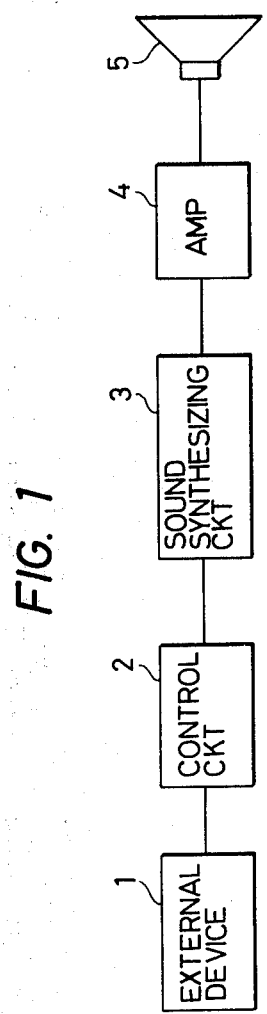
FIG. 1 is a schematic block diagram of the sound synthesizing apparatus according to the present invention.

FIG. 1 illustrates a schematic block diagram of an embodiment of sound synthesizing apparatus according to the present invention. The sound synthesizing apparatus comprises an external device or devices 1, which may be one or more push-button or switch, a control circuit block 2, a sound synthesizing circuit block 3, an amplifier 4 and a loud speaker 5. Briefly describing the function of the apparatus of FIG. 1, when a command or instruction signal is applied from the external device 1 to the control circuit block 3, the control circuit block 3 edits a plurality of vocal words prestored in a memory (not shown in FIG. 1) so as to make a sentence. Parameters corresponding to respective words are read out to be transmitted to the sound synthesizing circuit block 3 in a sequence. The sound synthesizing circuit block 3 reproduces a sound signal in receipt of the parameters from the control circuit block 2. In order to reproduce a sound signal on the basis of such parameters, linear production coding (LPD) or phoneme composing is effected. After the sound signal is reproduced, the sound signal is amplified by the amplifier 4 to drive the loud speaker 5.

The control circuit block 2 and the sound synthesizing circuit block 3 are respectively constructed of separate LSIs. However, in the future it will be possible to form these two blocks on a single chip of an LSI circuit. Furtheremore, it will be also possible to assemble the amplifier block 4 as well as peripheral circuits in the single chip of the blocks 2 and 3. The novel feature of the present invention resides in the structure of the above-mentioned control circuit block 2, and therefore, detailed description thereof will be made hereafter. Remaining circuits, such as the sound synthesizing control circuit block 3, the amplifier 4 and so on, are of conventional design, and therefore, description of these known circuits or blocks is omitted.

Figure 2:
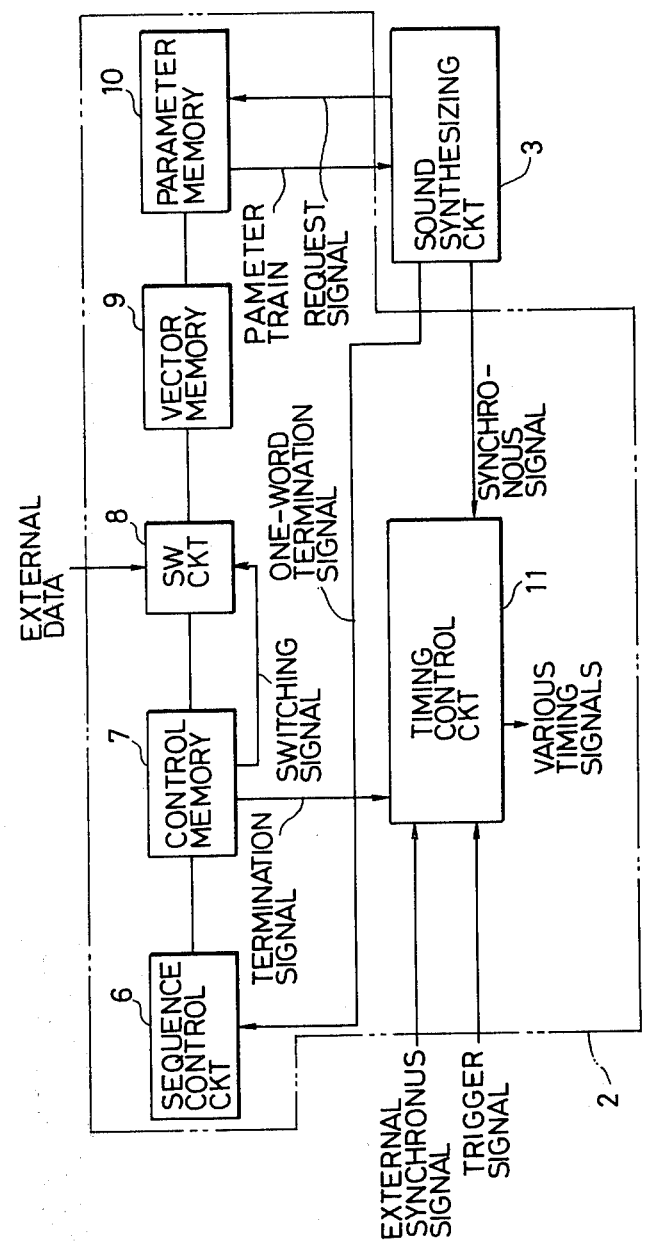
FIG. 2 is a schematic block diagram of the control circuit of FIG. 1.

Reference is now made to FIG. 2, which shows a block diagram of the above-mentioned control circuit block 2. In FIG. 2, a portion enclosed by dotted lines corresponds to the control circuit block 2 of FIG. 1. The control circuit block 2 comprises a timing control circuit 11, a sequence control circuit 6, a control memory block 7, a switching circuit 8, a vector memory block 9 and a parameter memory block 10. The timing control circuit 11 is driven by a trigger signal applied from the external device 1 of FIG. 1. This trigger signal may be produced by a push-button or may be obtained from a clock pulse generator. For instance, when a clock pulse generator is used to supply the trigger signal, the trigger signal may represent right or exact hour information. The timing control circuit 11 is also responsive to a synchronous signal from the sound synthesizing circuit 3, and to another synchronous signal from the external device 1. As the latter synchronous signal, a pulse train signal having a frequency of 1 Hz may be used. The timing control circuit 11 thus generates various timing signals which will be used when the various circuits of the control circuit 2 operate as will be described later.

Figure 3:
FIG. 3 is an explanatory view of one word of bits in the control memory block of FIG. 2.

The sequence control circuit 6 determines the address of the control memory block 7 so as to determine the order of vocal words to be emitted from the loud speaker 5 of FIG. 1. The control memory block 7 can be thought as the brain of the apparatus, and each word of bits of the contents of the control memory block 7, as shown in FIG. 3, is formed of a control region defining conditions of vocal words to be pronounced and other conditions, switching information, with which it will be determined whether or not information to be pronounced is to be taken from outside of the apparatus, and an address region indicative of the address of the vector memory block 9. Namely, each word of bits of the control memory block 7 is assigned to each word to be pronounced, and thus pronouncing condition and pronouncing sounds will be selected one after another for each word. When a termination code is detected in the contents of the control memory block 7, the timing control circuit 11 will be informed of the fact of detection to terminate pronouncing operation.

The switching circuit 8 selects one of two pieces of information; i.e. the information from the address region of the control memory block 7 and the other information is from the external device 1, as information for designating the address of the vector memory block 9.

The parameter memory block 10 is used to store parameters which have been obtained by compressing sound information to be emitted. The arrangement of the parameter memory block 10 is such that a plurality of blocks exist, in each of which information corresponding to one vocal word is stored. In each block is written a stop code. In the vector memory block 9, is stored a first address.

Accordingly, the address of the vector memory block 9 is selected in accordance with the address region of the control memory block 7 or external data, and the selected information designates a first address of a block of the parameter memory block 10. A REQUEST signal is applied from the sound synthesizing circuit 3 to the parameter memory block 10 to read out sound data from designated addresses in a sequence as a parameter train. The parameter train is applied to the sound synthesizing circuit 3 so as to be connected into sound signals which will be emitted from the output of the sound synthesizing circuit 3. When the sound synthesizing circuit 3 detects a stop code in the parameter train, the sound synthesizing circuit 3 produces a one-word termination signal which will be fed to the sequence control circuit 6. As a result, the address of the control memory block 7 is advanced to pronounce a subsequent vocal word. In this way, each vocal word is pronounced one after another in a given sequence. When a termination code is detected, the control memory block 7 supplies the timing control circuit 11 with a termination signal to terminate the sequence of operations, so that the control circuit 2 of FIG. 2 returns to the initial state, namely, the state before the trigger signal is applied thereto.

Next, the operation of the control circuit 2 will be described in detail with reference to an example of informing or telling the hour by vocal sounds. Namely, in this example, the sound synthesizing apparatus functions as a clock which tells the hour by pronouncing vocal sounds. The clock is driven at an instant several seconds prior to each right or exact hour, i.e. just 1 o'clock, 2 o'clock, 3 o'clock . . . 12 o'clock, and tells the hour by vocal sounds together with imitation sounds. For instance, in the case of 10 o'clock, the vocal sounds to be pronounced will be as follows:

"PIN PON NOW (TEN O'CLOCK) WILL BE INFORMED PI PI PI PONE"

In the above, each unit underlined corresponds to a single vocal word. The contents in the bracket is variable, and varies in accordance with the hour. The sounds "PIN PON", "PI" and "PONE" are all imitation sounds, while other sounds are similar to human's vocal sounds. The clock tells the hour on the hour at the time of emission of the sound, "PONE".

The hour of the clock can be adjusted when the clock is set in an adjusting mode. In this adjusting mode, when a time adjusting button or keys is continuously depressed, a sound of "PI" is emitted every one second. For instance, when it is intended to set the clock to 6 o'clock, the time adjusting button may be continuously depressed until five sounds of "PI" will have been emitted. After the fifth sound is emitted, the button is released, so that next hour to be telled will be six.

Figure 4:
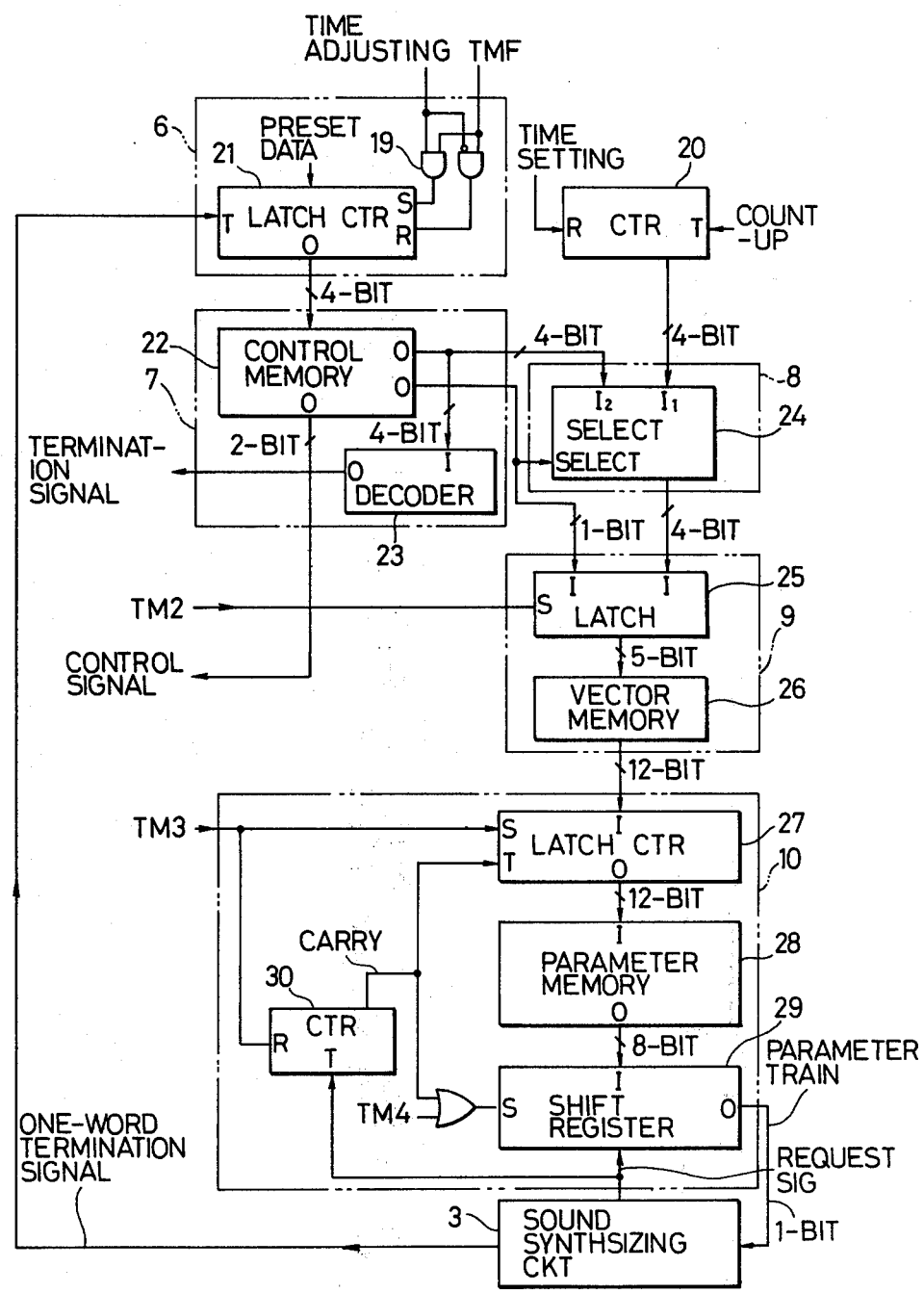
FIG. 4 is a detailed block diagram of the control circuit, which is arranged so that the sound synthesizing apparatus functions as an hour-telling clock.

FIG. 4 illustrates a detailed block diagram of the control circuit 2 of FIG. 2. In FIG. 4, the timing control circuit 1 of FIG. 2 is not shown for simplicity. Block or blocks enclosed by dotted lines in FIG. 4 respectively correspond to the blocks of FIG. 2, as indicated by the common reference numerals.

The reference 20 is a portion of the hour-telling clock, and is constructed of a divide-by-12 counter. In the divide-by-12 counter 20, a counted number, which is equal to the hour of the clock, is stored, and the number will be counted up by one every hour on the hour (strictly speaking, counting up is effected at an instant several seconds prior to each exact hour). The contents of the divide-by-12 counter 20 will become external data of the switching circuit 8.

Figure 5:
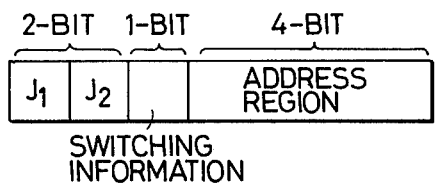
FIG. 5 is an explanatory view of one word of bits in the control memory of FIG. 4.

The control memory block 7 comprises a control memory 22 and a decoder 23 which detects the termination signal. In the memory 22, words of bits arranged in the form shown in FIG. 5 are prestored. In FIG. 5 the references J1 and J2 respectively indicate control information. Each of the control information J1 and J2 is made of one bit, and switching information of each word of bits is also made of one bit. The above-mentioned control information bits J1 and J2 as well as the switching information are arranged as shown in Table 1.

TABLE 1

| CONTROL INFORMATION | J1 | J2 | |
|---|---|---|---|
| | 0 | 0 | SUBSEQUENT WORD IS TO BE PRONOUNCED IMMEDIATELY AFTER A FORMER WORD |
| | 0 | 1 | SUBSEQUENT WORD IS TO BE PRONOUNCED 0.64 SECOND AFTER A FORMER WORD |
| | 1 | 0 | SUBSEQUENT WORD IS TO BE PRONOUNCED 1.28 SECOND AFTER A FORMER WORD |
| | 1 | 1 | A WORD IS TO BE PRONOUNCED IN RESPONSE TO AN EXTERNAL SYNCHRONOUS SIGNAL |
| SWITCHING INFORMATION | | 0 | EXTERNAL INFORMATION IS TO BE USED AS THE ADDRESS |
| | | 1 | CONTENTS OF THE ADDRESS REGION IS TO BE USED AS |

TABLE 1-continued

THE ADDRESS

When the sound synthesizing apparatus is used as an hour-telling clock, each vocal word is relatively short, while control of sounds is simple, and therefore, each word of bits is simple as shown in FIG. 5. The two bits J1 and J2 of the control information are used to determine an interval between a former vocal sound word or imitation sound word and a subsequent vocal sound word or imitation sound word to be emitted. Such a control of intervals is important in order that the above-mentioned sound of "PONE" is accurately emitted on the hour. Each word of bits stored in the control memory 22 further comprises an address region made of 4 bits. The information of the address region will be used only when the switching information bits is of logic "1", selecting one vocal sound word or limitation sound word from 15 words. In the case that all of the bits of the switching information and the address region are of logic "1", the decoder 23 construes this state as a termination code.

The following Table 2 shows the contents of each word of bits stored in the control memory block 7.

TABLE 2

| | ADDRESS OF CONTROL MEMORY | CONTENTS OF CONTROL MEMORY | | |
|---|---|---|---|---|
| WORDS | | CONTROL REGION | SWITCHING INFORMATION | ADDRESS REGION |
| PIN PON | 0 0 0 0 | 1 1 | 1 | |
| NOW | 0 0 0 1 | 0 0 | 1 | |
| (TEN O'CLOCK) | 0 0 1 0 | 0 0 | 0 | DON'T CARE |
| WILL BE INFORMED | 0 0 1 1 | 0 0 | 1 | |
| PI | 0 1 0 0 | 1 1 | 1 | |
| PI | 0 1 0 1 | 1 1 | 1 | |
| PI | 0 1 1 0 | 1 1 | 1 | |
| PONE | 0 1 1 1 | 1 1 | 1 | |
| (PRONOUNCING TERMINATION CODE) | 1 0 0 0 | DON'T CARE | 1 | 1 1 1 1 |
| EMPTY | 1 0 0 1 | | DON'T CARE | |
| | 1 0 1 0 | | | |
| | 1 0 1 1 | | | |
| PI | 1 1 0 0 | | 1 | |
| (PRONOUNCING TERMINATION CODE) | 1 1 0 1 | DON'T CARE | 1 | 1 1 1 1 |

An address "0" (0000) of the control memory 22 is a word of bits for selecting the imitation sound of "PIN PON". An address of the vector memory 26 has been written in the address region of the control memory 22. An address "1" (0001) is a word of bits for selecting the vocal word of "NOW". In a following address "2" (0010) to "7" (0111) are the same as the address "0" (0000). An address "8" (1000) is a termination code because all the bits of the switching information and the address region are of logic "1". An address "C" (1100) is a word of bits corresponding to a vocal word emitted when the hour of the clock is adjusted or corrected, while an address "D" (1101) is a termination code thereof.

Paying attention to the control region, both the bits J1 and J2 are of logic "1" at the sounds of "PIN PON" and "PI PI PI PONE". This means that these sounds are emitted in synchronization with an external synchronous signal. In this embodiment, the synchronous signal is a pulse train signal having pulses occurring every one second in accordance with the movement of the hand of the hour-telling clock. Remaining vocal sounds are emitted following a former sound.

It is a matter of course that the address region for each of the same sound of "PI" takes the same value. As shown in Table 2, addresses "9" (1001) to "B" (1011) are not used.

In FIG. 4, the sequence control circuit 6 controls the address of the control memory 22, and is formed of a latch counter 21 and a gate circuit 19. When telling the hour, a trigger pulse is generated by on-the-hour information, and a signal TMF, which follows the trigger signal, is applied via the gate circuit 19 to the latch counter 21 to reset the same. As a result, the addrss "0" of the control memory 22 will be selected. With this operation, the aforementioned imitation sound of "PIN PONE" is emitted, and when a one-word termination signal is emitted from the sound synthesizing circuit 3, the latch counter 21 is counted up by one to select or designate the address "1" of the control memory 22. Accordingly, the vocal sound of "NOW" will be emitted. After this, the addresses will be advanced one by one to pronounce a predetermined series of sounds until the pronouncing termination code is detected.

When effecting adjustment or correction of time, the above-mentioned time adjusting button is depressed, so that a time adjusting signal is applied via the gate circuit 19 to the latch counter 21. In this case, a value of 1101 is set in the latch counter 21 to designate the address "C". Therefore, the sound of "PI" is pronounced and the counter 20 is counted up by one. This operation will be repeated as long as the time adjusting button is being depressed. When the sound synthesizing apparatus functions as an hour-telling clock, the address of the control memory 22 is only counted up by one all the time. For this reason, the latch counter 21 is used to designate the address. However, when it is intended to perform further complex control, in which the address has to jump or return to an original address, it is possible to construct a general-purpose sequence control circuit of an adder and a latch.

The switching circuit 8 is constructed of a selector 24 of 4-bit, and selects external information I1 or the contents I2 of the address region of the control memory 22 as the address for the vector memory 26 in accordance with the switching information as well as the switching information from the control memory 22 is stored in a latch 25 of the vector memory block 9 in response to a timing signal TM2. The contents of an address designated by the output of the latch 25 are read out from the vector memory 26 in the form of 12-bit data. The maximum capacity of the vector memory 26 is 32 words of bits, where the addresses of the former 16 words of bits are respectively designated by the external information, and the addresses of the latter 16 words of bits are respectively designated by the output of the control memory 22. Namely, the memory region for vocal words or imitation sounds, which are always pronounced in the same manner, such as "PIN PON", "NOW" and the like, is separated from the other memory region for the changeable vocal words, such as "ONE O'CLOCK" . . . "TWELVE O'CLOCK".

The output of the vector memory 26 will be fetched into the latch counter 27 with the timing of the signal TM3 to designate an address of the parameter memory 28. The designated addresses respectively correspond to first addresses of respective regions in which parameters for respective vocal words have been stored. The output of the parameter memory 28 will be used for synthesizing sounds, and is fetched into a shift register 29 in the form of 8-bit in parallel. The contents of the shift register 29 are read out in response to a REQUEST signal which will be emitted from the sound synthesizing circuit 3, and are supplied to the sound synthesizing circuit 3. The REQUEST signal is counted by a divide-by-eight counter 30, so that the counter 30 emits a CARRY signal when the counted value becomes eight. In the presence of the CARRY signal, the counter latch 27 is advanced by one to advance the address of the parameter memory 28, and thus the contents of the subsequent address will be read out. In this way, sound synthesizing operation will be continuously performed by reading out parameters in a sequence until the sound synthesizing circuit 3 detects a subsequent stop code in parameters. When the sound synthesizing circuit 3 detects a stop code, it supplies the latch counter 21 with a one-word termination signal, and then the latch counter 21 is advanced by one to emit a subsequent vocal sound in the same manner. If the contents of the control memory 22 is a termination code, a termination signal will be emitted to disable the timing control circuit 11, so that all the operations will terminate.

Figure 6:
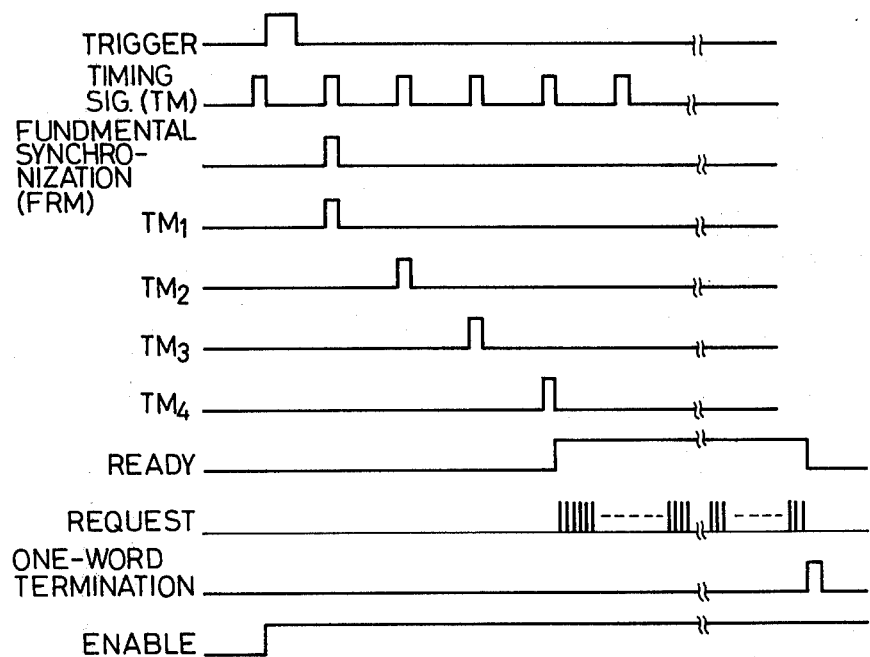
FIG. 6 is a timing chart useful for understanding the operation of pronouncing one vocal word.
Figure 7:
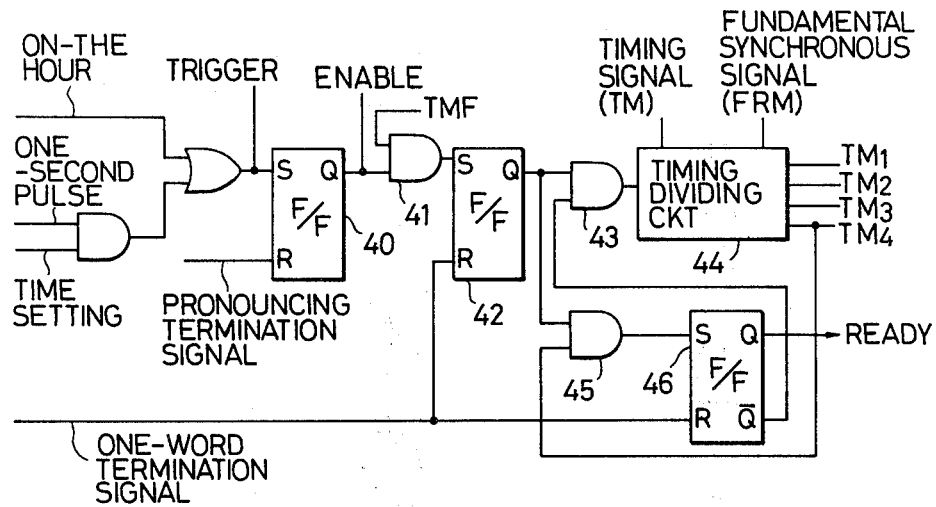
FIG. 7 is a block diagram of the timing control circuit of FIG. 2.

FIG. 6 is a timing chart showing various timings for pronouncing one vocal word. FIG. 7 is a partial circuit diagram of the timing control circuit 11. The structure and operation of the timing control circuit 11 will be described with reference to FIGS. 6 and 7. In the case of right hour signal or time adjusting mode, a trigger signal is generated by a one-second pulse, so that a flip-flop 40 assumes logic "1". This logic "1" signal is an enable signal, and maintains logic "1" until a series of pronouncings will terminate.

There are two synchronous signals emitted from the sound synthesizing circuit 3; the first one is a fundamental synchronous signal having pulses, each of which is emitted every 20 msec or 10 msec, and the second one is a timing signal TM having pulses, each of which is emitted every 2.5 msec. A timing dividing circuit 44 is a circuit for generating timing signals TM1 to TM4, and is arranged to operate only when a gate 43 is open. A flip-flop 42 controls open/close operations of the gate 43 and another gate 45. When the flip-flop 42 becomes logic "1", the above-mentioned timing signals TM1 to TM4 are generated one after another, and the timing signal TM4 passes through the gate 45 to set the flip-flop 46 and to close the gate 43. The output signal of the flip-flop 46 is a READY signal, and the control circuit 2 of FIG. 2 receives the REQUEST signal only when the READY signal is of logic "1". Accordingly, output sound signals will be emitted only during this interval. The flip-flops 42 and 45 are reset by the one-word termination signal from the sound synthesizing circuit 3, and at this time, the READY signal becomes logic "0" to stop sending the parameters.

The timing chart of FIG. 6 will be described with reference to the block diagram of FIG. 4. At the timing of the timing pulse signal TM1 the address of the control memory 22 is determined, and in a subsequent period between the pulse of TM1 and the pulse of TM2 the contents of the control memory will be read out. At the timing of TM2, the address of the vector memory 26 is latched, and then the contents of the vector memory 26 will be read out during an interval between TM2 and TM3. At TM3, the address of the parameter memory 28 is latched, and then a first data from the parameter memory 28 will be read out during an interval between TM3 and TM4. The read out data is fetched into the shift register 29 to terminate the oscillation of the timing control circuit 11. After this, the parameter memory 28 is controlled by only the sound synthesizing circuit 3 until one vocal word will have been pronounced, being separated from other circuits.

Figure 8:
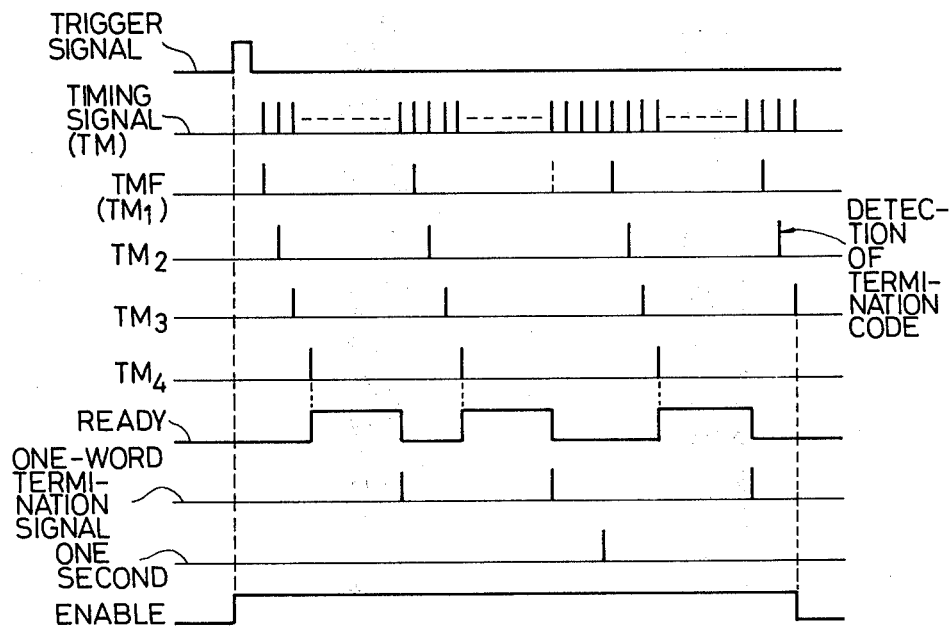
FIG. 8 is a timing chart useful for understanding the operation of pronouncing three vocal words.

The operation will be further described taking an example of a case of pronouncing consecutively three vocal words with reference to FIG. 8 which is another time chart. In this example, it is assumed that the bits of the control region of the control memory 22 are (0,0) for the first and second vocal words, and are (1,1) for the third vocal word. After detection of the trigger signal, the control circuit 2 starts operating for synthesizing the first vocal word in response to a coming timing pulse of TM1, and after TM4 the pronouncing of the first word will start. The control circuit 2 will start operating for the second vocal word in response to a subsequent pulse of the timing signal TM1 after the first word. However, the third word does not start immediately after the second word. Namely, the control circuit 2 waits for the above-mentioned one-second pulse, and thus operation will start in response to a pulse of the timing signal TM1 subsequent to a one-second pulse. The signal TMF is for starting pronouncing operation of each vocal word as described in the above. After termination of the pronouncing of the third word, operation for next vocal word should start in response to a subsequent pulse of the timing signal TM1. However, since the output of the control memory 22 represents the termination code, operation will terminate, rendering the ENABLE signal being logic "0" so as to finish a series of pronouncing, returning to the initial state.

Although the invention has been described in connection with an embodiment which functions as an hour-telling clock, the present invention is not limited to such a clock. Namely, the sound synthesizing apparatus according to the present invention may be used for synthesizing various vocal words after selecting and editing vocal words. In order to change the kinds and number of vocal words, and to change the order of pronouncing of vocal words, all required is to alter the contents of the control memory 22, the vector memory 26 and the parameter memory 28 in most cases. This means that the usage of the sound synthesizing apparatus according to the present invention can be readily changed to a desired one. In addition, since the way of operation of the control circuit 2 is defined by the contents of the control memory 22, various applications of the sound synthesizing apparatus are possible by altering the contents with the circuit arrangement changed little. As the control memory 22 as well as the vector memory 26 and the parameter memory 28, ROMs (read-only memories) may be used, so that the entire system will be small in size. Furthermore, these three memories may be actualized by a single ROM made of a single LSI chip. As a result, it is possible to provide a sound synthesizing apparatus of low cost.

The above-described embodiment is just an example of the present invention, and therefore, it will be understood for those skilled in the art that many modifications and variations may be made without departing from the spirit of the present invention.

What is claimed is:
1. A sound synthesizing apparatus comprising:
    (a) a sound synthesizing circuit for converting various parameters indicative of sound data into sound signals;
    (b) a timing control circuit for producing various timing signals in accordance with an external synchronous signal, a signal from said sound synthesizing circuit and with an external trigger signal;
    (c) a sequence control circuit responsive to a signal indicative of termination of one word from said sound synthesizing circuit, for generating an output signal;
    (d) a first memory in which information indicative of the order of words to be pronounced and intervals between said words as well as switching information are prestored, the address of said first memory being designated by said output signal of said sequence control circuit;
    (e) a variable data producing circuit for producing data which varies as a function of time;
    (f) a switching circuit controlled by said switching information for selecting said information indicative of the order of words from said first memory or the variable data;
    (g) a second memory in which pieces of information indicative of first addresses of sound data are prestored, one of said pieces of information being selected in accordance with said information or variable data from said switching circuit; and
    (h) a third memory in which said sound data is prestored as parameters, said sound data being read out in accordance with said information from said second memory one after another in synchronism with a timing signal from said timing control circuit and a signal from said sound synthesizing circuit.

2. A sound synthesizing apparatus comprising a sound synthesizing circuit, which converts sound data into sound signals, and a control circuit, said control circuit comprising:
    (a) a first memory in which information indicative of the order of words to be pronounced and intervals between said words as well as switching information are prestored, said first memory being arranged to send a piece of address information one after another in response to a timing signal fed thereto;
    (b) a variable data producing circuit for producing data which varies as a function of time;
    (c) a switching circuit controlled by said switching information for selecting said information indicative of the order of words from said first memory or the variable data;
    (d) a second memory in which pieces of information indicative of first addresses of sound data are prestored, one of said pieces of information being selected in accordance with said information or variable data from said switching circuit; and
    (e) a third memory in which said sound data is prestored as parameters, said sound data being read out in accordance with said information from said second memory one after another in synchroniusm with an external synchronous signal, the read out parameter train being fed to said sound synthesizing circuit to be converted into sound signals.

3. A sound synthesizing apparatus as claimed in claim 2, further comprising a decoder responsive to said output information from said first memory for detecting a termination signal.

4. A sound synthesizing apparatus as claimed in claim 2, wherein said second memory comprises a latch controlled by an external synchronous signal and a memory responsive to the output data of said latch.

5. A sound synthesizing apparatus as claimed in claim 2, wherein said third memory comprises:
   (a) a latch counter responsive to said information from said second memory;
   (b) a memory responsive to the output data from said latch counter;
   (c) a shift register responsive to the output data of said memory; and
   (d) means for controlling said latch counter and said shift register in accordance with external synchronous signals and with a request signal from said sound synthesizing circuit.

6. A sound synthesizing apparatus as claimed in claim 2, further comprising a sequence control circuit, said sequence control circuit having gate circuits responsive to external synchronous signal and to a signal, which is manually produced, and a latch counter responsive to output signals of said gate circuits.

* * * * *